Figure 1:
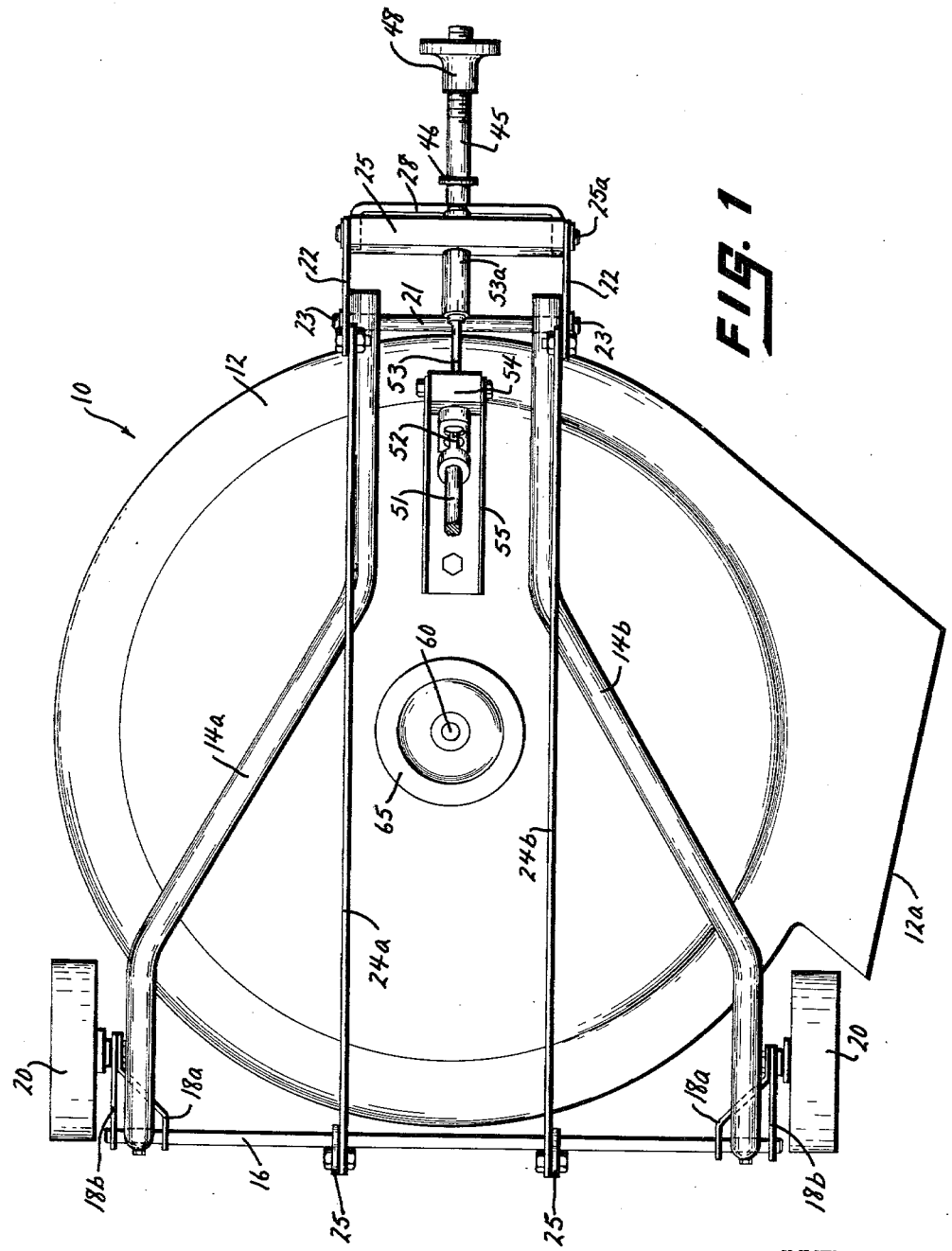

Aug. 10, 1965

L. C. HAHN 3,199,276

RIDING MOWER

Filed March 27, 1963

2 Sheets-Sheet 1

INVENTOR.
LLOYD C. HAHN
BY
*Warren D. Hachbert*
Attorney

Aug. 10, 1965
L. C. HAHN
3,199,276
RIDING MOWER
Filed March 27, 1963
2 Sheets-Sheet 2
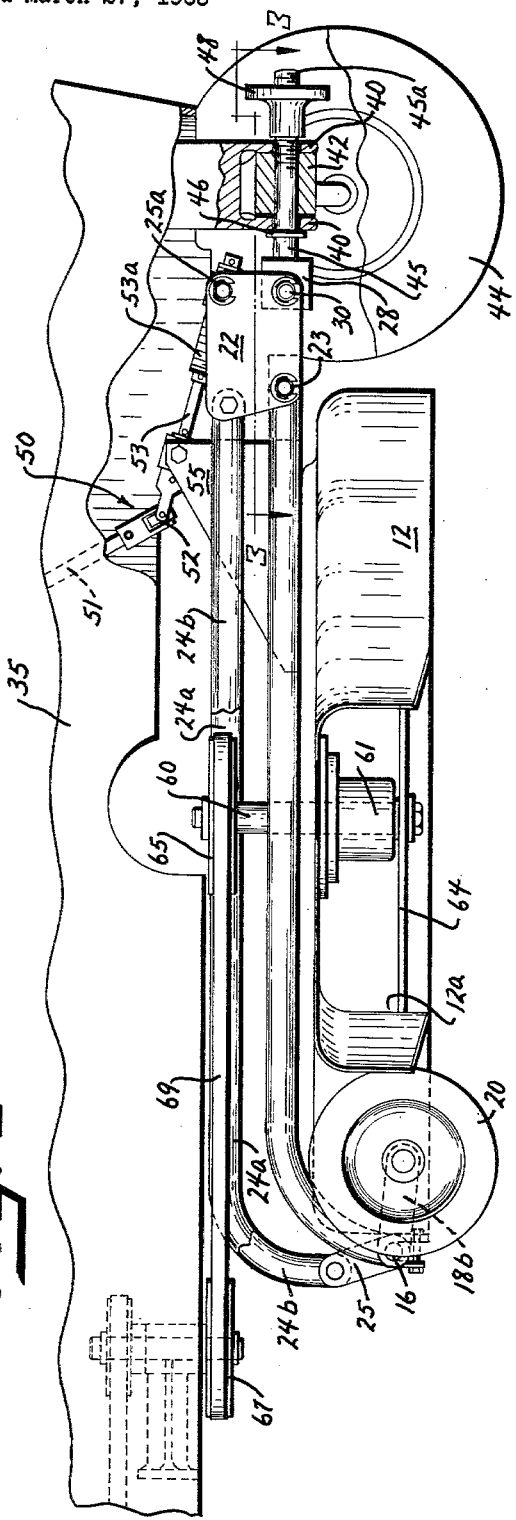
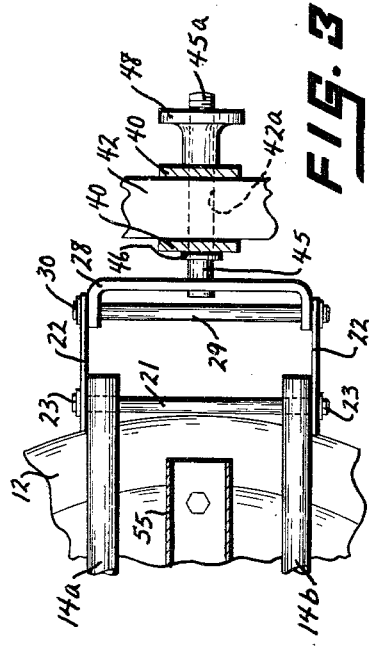
INVENTOR.
LLOYD C. HAHN
BY
*Warren D. Hachbert*
Attorney

United States Patent Office 3,199,276
Patented Aug. 10, 1965

3,199,276
RIDING MOWER
Lloyd C. Hahn, Vanderburgh County, Ind., assignor to Hahn, Inc., Evansville, Ind., a corporation of Indiana
Filed Mar. 27, 1963, Ser. No. 268,397
7 Claims. (Cl. 56—25.4)

The present invention relates to a riding mower, and more particularly to a new and novel suspension arrangement for the mower unit for such riding mower.

As is known, the popularity of lawn tractors either for home or commercial uses has become widespread, such lawn tractors or riding mowers providing a power unit for propelling the tractor as well as for driving the mowing unit, and a steering and seat arrangement for use of the operator. The mounting of the aforesaid mowing unit on the lawn tractor is quite important, in that a full "floating" thereof is highly desirable in order to prevent the so-called "scalping" effect on lawns defined by a variable ground contour. Prior types of lawn tractors have proven mostly objectionable in this latter respect, inasmuch as any movement of the mowing unit, independent of the chassis or framework of the riding mower, was either non-existent, or, as a matter of fact, was attainable only in a single direction. In other words, the aforesaid undesirable "scalping" effect was mostly the rule and not the exception in the instance of these prior devices.

By virtue of the instant invention, the applicant has provided a new and novel mounting arrangement for the mowing unit for a lawn tractor or riding mower, which mounting arrangement provides for the full "floating" of such mowing unit and, thereby, affords effective mowing irrespective of the ground contour. Restated otherwise, the instant invention permits the mower unit to follow the dips and rises of the ground, independent of the position of the tractor wheels, whereby a smooth, cleanly mowed lawn is attained with none of the aforesaid "scalping" effect.

Briefly, the applicant's new and novel invention is defined by depending spaced-apart support members positioned on the chassis or framework of the tractor, where such support members have aligned openings therein adapted to receive a forwardly disposed connecting member forming a part of the mower unit. The axle for the front wheels of the riding mower extends between the aforesaid depending support members, and as such axle also includes an opening therein, the assembly of the front wheels and the mower unit is readily and positively achieved by passing the connecting member through the opening in one of the support members, the opening in the axle for the wheels, and the opening in the other of the support members. As the connecting member has a threaded end, the assembly is completed by use of an oversized knob or nut threadedly secured thereto.

In other words, the applicant has provided herein a new and novel single point suspension arrrangement for the mower unit for a riding mower which permits full "floating" effect, i.e. rotatably to the path of travel of the lawn tractor, as well as in an upwardly and downwardly direction. The aforesaid rotatable movement is attained by reason of a relatively loose fit between the connecting member and the openings in the depending support members and the axle for the wheels, while the upwardly and downwardly movement is attained through structure forming part of the mowing unit.

Accordingly, the principal object of the present invention is to provide a new and novel suspension arrangement for the mowing unit for a lawn tractor.

Another object of the present invention is to provide a new and novel single point mounting arrangement for a mowing unit, which permits full "floating" of the latter during use.

A further object of the present invention is to provide a new and novel mounting assembly for the front wheel axle and the mowing unit for a lawn tractor.

A still further and more general object of the present invention is to provide a new and novel mowing unit suspension arrangement which effectively permits rotatable and vertical movement during use, and which, at the same time, represents manufacturing economies and ease in assembly techniques.

Other objects and a better understanding of the present invention will become more apparent from the following description, made in conjunction with the accompanying drawings, wherein FIG. 1 is a plan view of a mower unit for a lawn tractor in accordance with the teachings of the instant invention;

FIG. 2 is a view in side elevation, partly fragmentary, showing details of the applicant's new and novel mounting arrangement; and, FIG. 3 is a fragmentary plan view, generally taken at line 3—3 of FIG. 2 and looking in the direction of the arrows, showing still further details of the instant invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, a typical mowing unit 10 in accordance with the instant invention comprises a framework to which a cutting blade housing 12 is secured, as by welding, for example. As should be apparent from the drawings, the cutting blade housing 12 is typically circular in top plan view, and includes an opening 12a in a side portion thereof for permitting the passage of grass cuttings during mowing. The aforesaid framework includes tubular members 14a and 14b which, in a preferred embodiment of the invention, conform to the outer configuration of the cutting blade housing 12, curving downwardly at the rear end thereof. The aforesaid tubular members 14a and 14b rotatably engage a lateral member 16, where at opposite ends thereof, and at supporting members 18a and 18b, wheels 20 are positioned, through conventional mounting assemblies.

The forward ends of the tubular members 14a and 14b of the framework are interconnected by a member 21 which extends through openings in each, where a pivot plate 22 engages each of such tubular members 14a and 14b and is secured thereto by nut and washer assemblies 23. Other members 24a and 24b extend from the forward to the rearward end of the mower unit 10, spaced above the aforesaid tubular members 14a and 14b and curving downwardly at the rear end of each, with an interconnecting member 26 extending between each of such members 24a and 24b and the lateral member 16, being fixedly secured to the latter. The forward end of each of the members 24a and 24b is pivotally connected to the pivot plate 22.

Further, the pivot plates 22 have a bar-like member 25 extending therebetween, with washer and nut assemblies 25a completing such assembly. A pivotal interconnecting member 28 also extends between the pivot plates 22, and a shaft 29 passes through openings in rearwardly disposed end portions of such interconnecting member 28 and through the pivot plates 22. Nut and washer assemblies 30 secure the interconnecting member 28 and the shaft 29 in the aforesaid position.

The aforedescribed mowing unit 10 is typically used in connection with a lawn tractor 35, only partially shown in the drawings. In any event, and depending from the chassis or framework (not shown) of the aforesaid lawn tractor 35, and either integral or separate therewith, are support members 40, which are typically disposed laterally with respect to the path of travel of the lawn tractor 35. The aforesaid support members 40 are spaced apart one from the other, each having an aligned opening therein. The axle 42 for the front wheels 44 of the lawn tractor 35 is received in the space between the support members 40, and an opening 42a is provided therein which, in use, is aligned with the openings in the support members 40.

A member 45 extends forwardly of the member 28, having a threaded free end portion 45a which is adapted to receive an internally threaded knob 48. A collar 46 is provided on the member 45 to position the mower unit 10 for use, to be explained herebelow.

For reasons of vertical adjustment, mechanism 50, in the form of a rod 51, a universal joint 52, and an interconnecting member 53 rotatably secured at 54 to a generally U-shaped upwardly extending member 55, defines part of the instant lawn tractor, where the latter is fixedly secured to the top surface of the cutting blade housing 12. The interconnecting member 53 has a threaded portion 53a thereof which extends through the member 25, and, in view of the latter, rotation of member 53 effects upward and downward movement, i.e., the vertical adjustment, of the mower unit 10.

The over-all assembly is completed by a drive shaft 60 which extends downwardly into the cutting blade housing 12, passing through a conventional bearing assembly 61. A cutting blade 64 is secured to the lower end of the aforesaid drive shaft 60, while a pulley 65 is positioned on the upper end of the latter. A power system for the instant lawn tractor includes, among other components, a driving mechanism (shown in broken lines in FIG. 2), and a pulley 67, where the latter interconnects with pulley 65 by belt 69.

In use, the mower unit 10 is secured in position on the lawn tractor 35 by introducing the member 45 through the aligned openings in the support members 40 and in the axle 42 for the front wheels, with the ultimate assembled position of such member 45 being controlled by the collar 46 thereon. The knob 48 is then threadedly secured to the end 45a of the member 45 to define the over-all assembly. In order to effect vertical adjustment of the mowing unit 10 to accommodate various lawn heights, the mechanism 50 may be employed, with the rotation of the rod 51 thereof, and associated members, resulting in the movement of the threaded portion 53a of the interconnecting member 53 in the bar-like member 25. In other words, the threaded portion 53a of the member 53 is moved with reference to the fixed flange 55, meaning that the cutting blade housing 12, which is in engagement therewith, moves, as desired, either upwardly or downwardly.

It might be noted that the aforesaid upward and downward movement of the cutting blade housing 12 is effected through pivotal action of the pivot plates 22, i.e., with respect to members 14a and 14b, and 24a and 24b. Additionally, in view of the pivotal relationship between the aforesaid interconnecting member 28 and the pivot plates 22, when uneven terrain is encountered during mowing action, the mowing unit 10 moves upwardly and downwardly.

Moreover, in view of the relationship of the member 45 and the aligned openings in the support members 40 and in the axle 42 for the front wheels, the mowing unit 10 is readily susceptible to rotatable movement during cutting. Restated otherwise, the member 45 is rotatably disposed in the aforementioned components and, accordingly, readily rotates when the terrain so dictates.

From the preceding, it should be understood that the applicant has provided a single point suspension for a mower unit for a lawn tractor which is readily and easily movable either upwardly or downwardly, or rotatably about the longitudinal axis of the lawn tractor, or both, when in use, representing an important contribution to the industry. It should be apparent that the instant invention is readily assembled, merely requiring the use of knob 48 on the member 45 after the latter has been positioned through the support members 40 and the axle 42 for the front wheels. As explained hereabove, the instant invention provides a full "floating" action, one which is not available in any of the prior structures now in use, in that the latter are movable, if at all, in a unilateral direction.

The mounting arrangement disclosed hereabove is, of course, susceptible to various modifications in accordance with the spirit of the invention. For example, proportions insofar as over-all dimensions are concerned may be varied, and other specific mower unit driving arrangements employed, all with equally effective end results, the important underlying principle being the effective upward and downward, and rotatable, movement of the mower unit in a free "floating" relationship, independent of the wheels of the lawn tractor. Additionally, and in this latter respect, it should be remembered that the instant invention provides for the ready single suspension, i.e., one point suspension, of any accessory which might be used in connection with a device of the general character at hand. In any event, the above description should be considered illustrative, and not as limiting the scope of the following claims.

I claim:

1. In a lawn tractor having a framework, in combination, support members depending from said framework and having aligned openings extending therethrough, a mower unit having a pivotal forwardly extending portion, and a wheel axle having an opening extending through a portion thereof and alignable with said openings in said support members, said pivotal forwardly extending portion of said mower unit passing through said openings in said support members and said opening in said portion of said wheel axle whereby said mower unit and said wheel axle are independently rotatably mounted.

2. The structure of claim 1 where means are provided on said pivotal forwardly extending portion of said mower unit for maintaining said mower unit, said wheel axle, and said support members in assembled relationship.

3. In a lawn tractor having a framework, in combination, spaced-apart support members depending from said framework and having aligned openings extending therethrough, a mower unit having a pivotal forwardly extending portion permitting vertical movement of such mower unit, means for adjusting the height of said mower unit, and a wheel axle having an opening extending through the mid-portion thereof and alignable with said openings in said spaced-apart support members, said mid-portion of said wheel axle being received between said spaced-apart support members and said pivotal forwardly extending portion of said mower unit passing through said openings in said spaced-apart support members and said openings in said mid-portion of said wheel axle whereby said mower unit and said wheel axle are independently rotatably movable.

4. The structure of claim 3 where said forwardly extending portion of said mower unit is a rod having a threaded free end.

5. The structure of claim 4 where a locking member engages the threaded free end of said rod for maintaining said mower unit, said wheel axle, and said spaced-apart support members in assembled relationship.

6. The structure of claim 5 where a collar is provided on said rod to control the assembled relationship between said mower unit, said wheel axle, and said spaced-apart support members.

7. A lawn tractor having a framework, a single supporting member centrally depending from the front of said framework, a transversely positioned wheel axle disposed adjacent the bottom end of said supporting member, and a mower unit having a single forwardly extending pivotal portion mounted by said supporting member and extending through said wheel axle whereby said mower unit and said wheel axle are independently rotatably mounted.

References Cited by the Examiner
UNITED STATES PATENTS

| | | | |
|---|---|---|---|
| 2,931,156 | 4/60 | Fulwider | 56—25.4 |
| 2,972,850 | 2/61 | Ariens et al. | 56—25.4 |
| 3,077,065 | 2/63 | Samways et al. | 56—25.4 |
| 3,118,266 | 1/64 | Colburn | 56—25.4 |

T. GRAHAM CRAVER, *Primary Examiner.*

CARL W. ROBINSON, *Examiner.*